United States Patent [19]

Carn et al.

[11] Patent Number: 4,991,861
[45] Date of Patent: Feb. 12, 1991

[54] BICYCLE VEHICLE HAVING FRONT AND REAR STEERABLE WHEELS

[76] Inventors: Rozenn M. F. Carn; Gwendoline M. K. Carn, both of 17, Cite de Kerguelen, FR 29000, Quimper, France

[21] Appl. No.: 286,956
[22] PCT Filed: Apr. 5, 1988
[86] PCT No.: PCT/FR88/00165
§ 371 Date: Nov. 29, 1988
§ 102(e) Date: Nov. 29, 1988
[87] PCT Pub. No.: WO88/07467
PCT Pub. Date: Oct. 6, 1988
[51] Int. Cl.⁵ .............................. A63C 17/06
[52] U.S. Cl. ....................... 280/87.042; 280/11.2; 280/11.23; 280/810
[58] Field of Search ............ 280/87.042, 87.041, 280/11.23, 11.22, 11.2, 810, 267, 842

[56] References Cited

U.S. PATENT DOCUMENTS

| 3,023,022 | 2/1962 | Boyden | 280/87.042 |
|---|---|---|---|
| 3,421,420 | 1/1969 | Piatkowski | 94/50 |
| 4,445,699 | 5/1984 | Darasko | 280/87.042 |
| 4,466,372 | 8/1984 | Rudloff | 280/87.042 |
| 4,555,122 | 11/1985 | Harvey | 280/87.041 |
| 4,681,333 | 7/1987 | Rouge et al. | 280/87.042 |

FOREIGN PATENT DOCUMENTS

| 1428921 | 2/1969 | Fed. Rep. of Germany | 280/11.23 |
|---|---|---|---|
| 3442193 | 11/1985 | Fed. Rep. of Germany | 280/87.042 |
| 569896 | 4/1924 | France | 280/11.23 |
| 2438570 | 5/1980 | France | 280/810 |
| 2607713 | 6/1988 | France | 280/87.042 |
| 2135950 | 9/1984 | United Kingdom | 280/810 |

Primary Examiner—David M. Mitchell
Attorney, Agent, or Firm—Eckert Seamans Cherin & Mellot

[57] ABSTRACT

A coaster having a passenger-receiving footplate (1) which is mounted on at least two wheels (7). According to the invention, the wheels (7) are connected to the footplate (1) by arms (3) which pivot horizontally about pivot pins (2) connected to the footplate and pivot rods (4) connected to the wheels, with the distance between the rods (4) being less than the distance between the pins (2).

7 Claims, 2 Drawing Sheets

COASTER VEHICLE HAVING FRONT AND REAR STEERABLE WHEELS The present invention relates to a coaster vehicle having front and rear steerable wheels with the course of the vehicle being controlled by tilting the passenger-supporting body sideways, with each wheel being fixed to the body by a pair of arms pivoting about vertical axes situated firstly at one of the ends of the body and secondly at the axis of rotation of the wheel, with the distance between the vertical axes on the body being substantially different from the distance between the vertical axes at a wheel, thereby defining a trapezium which is deformable as a function of the tilt of the body.

The object of the present invention is to provide a vehicle which is steerable by sideways tilting of its platform, footplate, or body, with its radius of gyration being small by virtue of suspended steering systems for both the front wheels and the rear wheels.

According to the invention, the coaster constituted by a passenger-receiving footplate mounted on at least a front wheel and a rear wheel, is characterized in that each wheel is connected to the footplate by arms which are pivotally mounted firstly about axes fixed to the footplate and secondly about axes at the ends of the wheel axle, thereby defining a trapezium.

Other characteristics and advantages of the present invention appear from the following description of particular embodiments given purely by way of non-limiting example, and with reference to the drawings, in which.

Figure 5:
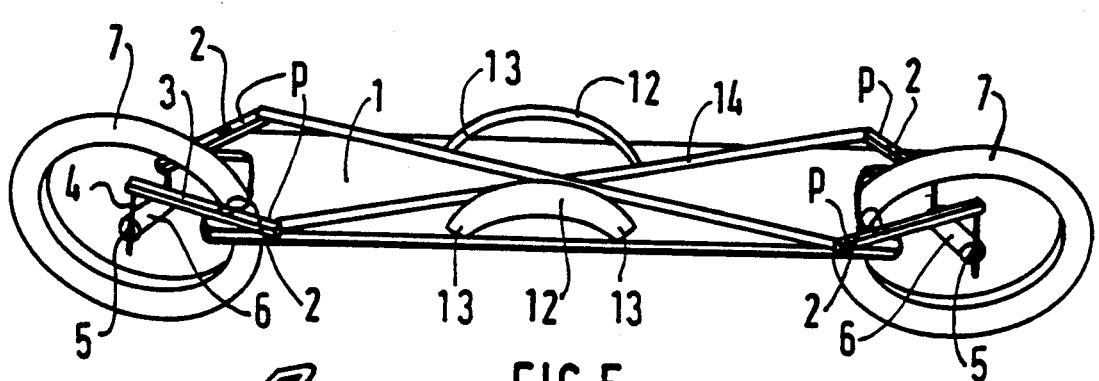
FIG. 5 is a perspective view from below of a coaster equipped with rods interconnecting the wheels.

In the drawings, the spokes of the wheels have been omitted for reasons of clarity.

Figure 1:
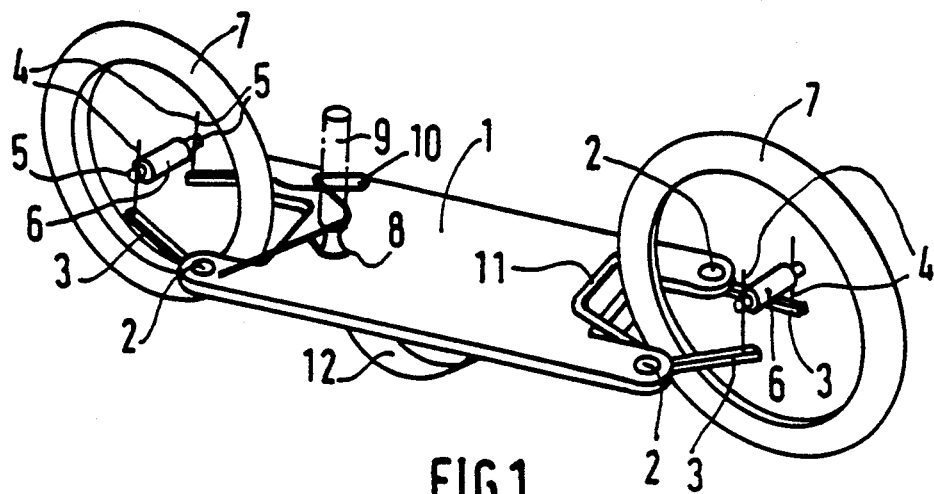
FIG. 1 is a perspective view from above of a coaster in accordance with the invention.

In FIG. 1, a footplate 1 or body is notched at each end in order to receive a corresponding wheel. Vertical housings are disposed on either side of each notch to receive pins 2 whose degree of offset relative to the vertical may be controlled by an accessory system.

Figures 3, 4:
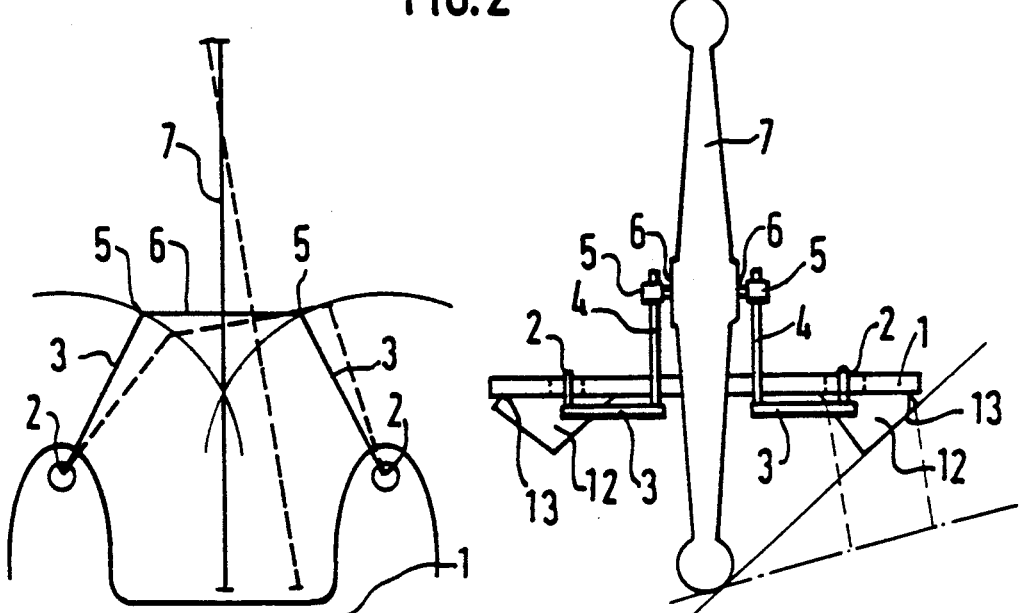
FIG. 3 is a diagram showing the steering arrangements of each wheel.
FIG. 4 is a front view of the coaster.

An arm 3 pivots horizontally about each pin 2 with each arm being in the form of a crank having a vertical rod 4 slidably received in a cursor 5 to slide perpendicularly to the axle 6 of the corresponding wheel 7. The positions of the cursors 5 on their rods 4 are controlled by screws. Since the distance between the cursors 5 remains smaller than the distance between the pins 2, it will be understood that when the arms 3 swing sideways, the corresponding wheel 7 swivels, in particular when the footplate (1) is tilted. FIG. 3 shows the theory of such trapezium steering.

The footplate 1 has a point 8 which is intended to receive the base 9 of rigging for sail propulsion of the assembly. Since the rigging is of the windsurfer type, it is free to move in all directions about the point 8. A W-shaped frame 10 serves to restrict this freedom by causing the rigging 9 to engage the footplate 1 when the rigging is pushed forwardly. This makes it easier for the passenger to change the position of his feet on the footplate, in particular when changing tack.

A brake 11 is shown at the rear of the footplate 1 and comprises a frame which pivots about a horizontal axis supported by the footplate 1. The top portion of this frame is suitable for being actuated by a foot of the passenger, with its bottom portion bearing against the tread of the wheel 7. To this end, said bottom portion is provided with a nonabrasive friction coating, e.g. a rubber pipe. It should be observed that by virtue of the trapezium steering system, the tread remains at the same distance from the footplate even when turning, and as a result the degree of braking remains the same regardless of the position of the wheel 7 along the rectilinear bar constituting the brake element. Finally, FIG. 1 shows one of two side skids 12 which serve to provide a smooth sliding surface on the ground when the footplate is tilted by the passenger. If the passenger wants to limit the extent to which tilting is possible, then the position of the skids can be changed so that they come into contact with the ground more quickly. The embodiment shown herein is constituted means of conically curved sheets (e.g. made of polyethylene) whose outside connections 13 to the footplate are capable of being moved towards each other for each skid. It can be seen that the closer these points are moved together, the greater the curvature of the outside edges of the curved sheets relative to their inside edges, thereby presenting an optimum surface for coming into contact with the ground regardless of the curvature, and this effect is enhanced by the way in which the assembly bends when loaded.

Figure 2:
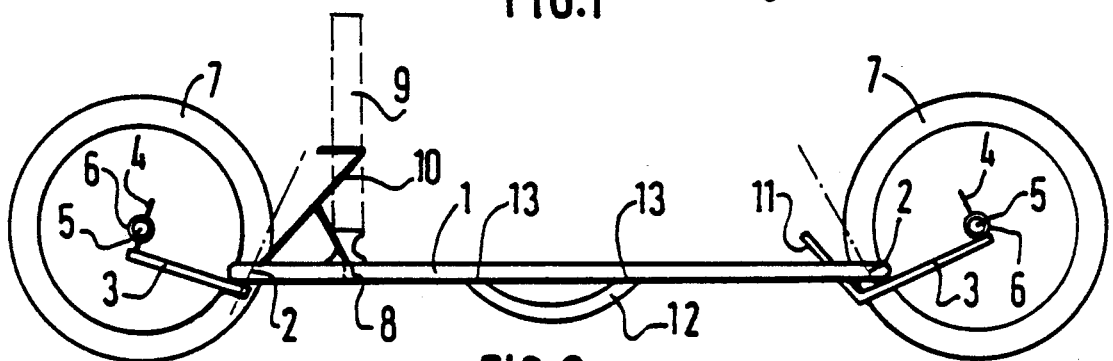
FIG. 2 is a side view of the coaster.

FIG. 2 is a side view of the assembly and helps to make the shapes and the positions of the above-mentioned accessories easier to grasp, i.e. the mast abutment 10, the brake 11, and the skid 12. It also shows how the pins 2 are tilted relative to the vertical at a rake suitable for returning the wheels to the axial position when the footplate is returned to the horizontal position. FIG. 4 shows, more particularly, the variation in the positions of the skids 12 between two extreme positions, one shown in solid lines and corresponding to maximum possible footplate tilting and the other shown in dashed lines and corresponding to minimum footplate tilting.

In FIG. 3, solid lines show the axial position of the wheel 7 and the corresponding position of the trapezium 2, 3, 5, 6, 5, 3, 2, relative to the footplate, 1, and dashed lines show angularly offset position of the wheel and the corresponding position of the trapezium.

FIG. 5 shows an assembly for linking the two wheels together and for stiffening the footplate under load. To this end, each of the arms 3 is extended beyond its pin 2 by a portion P which is horizontally pivoted at its end to a rod 14 whose other end is connected to the portion P of the diametrically opposite arm. It can be seen that the front and rear wheels then occupy identical positions. This is particularly useful when the bicycle is propelled by the wind causing greater sideways thrust to be applied to the rear wheel by virtue of the center of effort of the sail being generally offset rearwardly. The rods 14 also perform two other functions by stiffening the footplate 1 and by facilitating rotation of the arms 3. They put a limit on the maximum possible distance between the bottom ends of the pins 2, thereby reducing bending of the footplate 1. Further, by tending to maintain the arms 3 in the horizontal position, they reduce the friction thereof about their pivot pins 2. FIG. 5 also shows how the skids 12 are disposed on the underside of the footplate 1, on either side of the rods 14.

Figure 6:
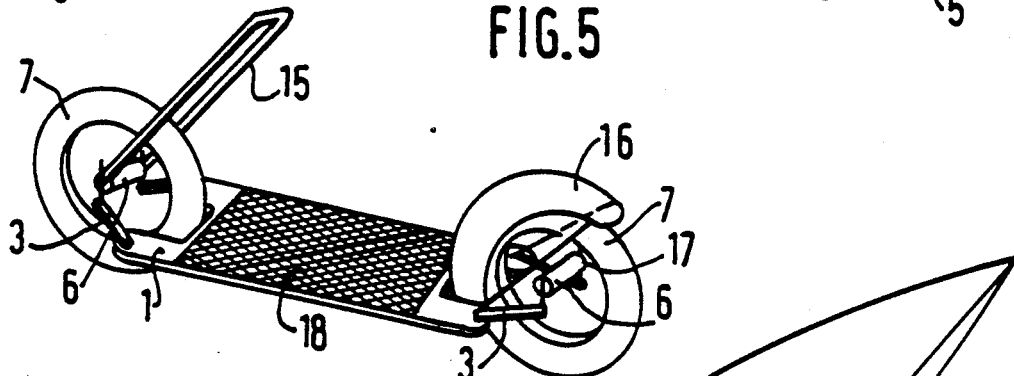
FIG. 6 is a perspective view of a coaster fitted with a steering column, a rear mudguard, and an anti-slip service.

In FIG. 6, a steering column 15 is connected to the front wheel at the ends of its axle 6, with the steering column being constituted by two parallel arms interconnected by a horizontal portion, leaving the column 15 free to pivot about the axle 6. By rotating the horizontal portion of the column parallel to the axle 6, and by pushing its parallel arms sideways, it is possible to steer the front wheel. A mudguard 16 over the rear wheel is supported by an arch 17 allowing it to withstand considerable force. Not only does the mudguard act as a mudguard, it also acts as a support point for the passenger who may wish to sit on it or perform acrobatics, with or without rigging. It extends beyond the vertical passing through the point at which the rear wheel comes into contact with the ground so as to allow the passenger to cause the front of the bicycle to rear up when the passenger applies a greater or lesser amount of weight to the end of the mudguard 16.

The platform 1 is covered with a strong net 18, e.g. of the type used for trawling, thereby providing a non-slip surface state, which is particularly effective when the net is wet or covered in sand or mud. The mesh of the net 18 covering the underside of the footplate 1 may be used for retaining the ends of the skids 12 which engage therein, with each mesh corresponding to a given degree of curvature for each skid 12.

Figure 7:
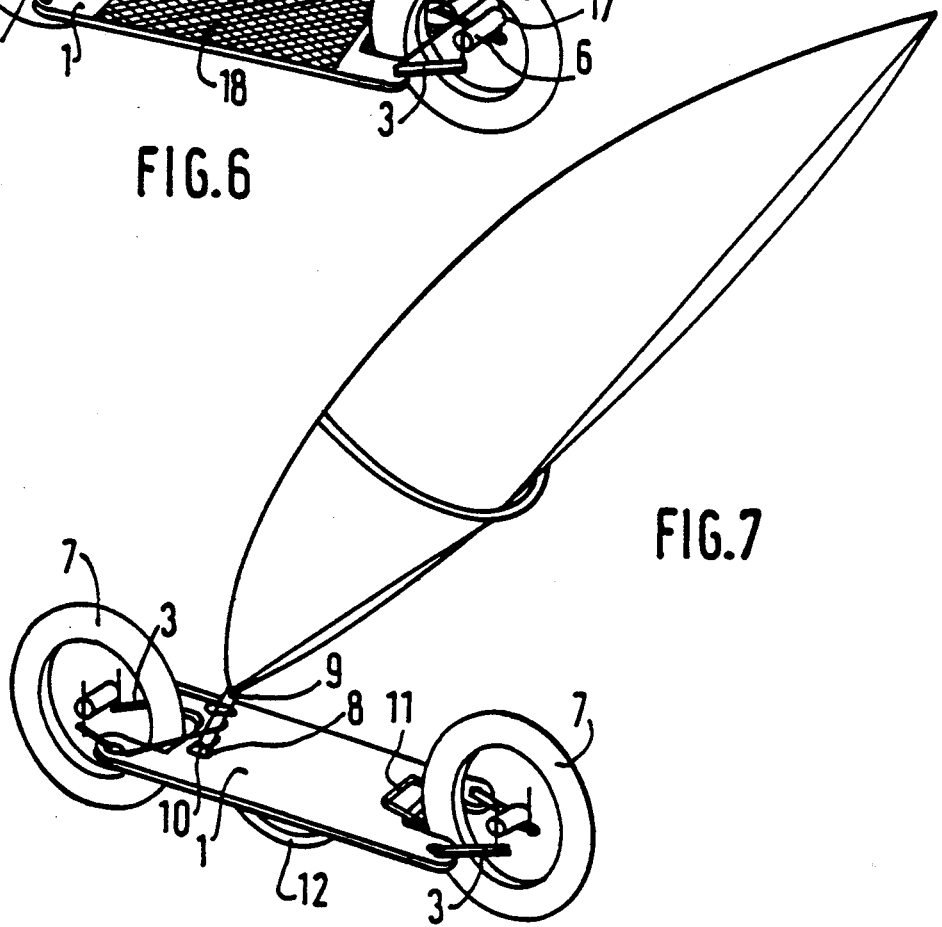
FIG. 7 is a perspective view of a bicycle fitted with a symmetrical sail.

FIG. 7 shows a bicycle equipped with a symmetrical ARC type (trademark) rig. In order to allow the rig to engage the W-shaped abutment 10, the bottom of the rig is extended by an axial member 9 which performs the same function as the base of a single mast.

Naturally, numerous variants may be envisaged, in particular by substituting technically equivalent means, thereby going beyond the scope of the invention.

We claim:
1. A coaster comprising
   a front wheel, the front wheel being rotative about a front axle;
   a rear wheel spaced from the front wheel, the rear wheel being rotative about a real axle;
   a footplate supported between the front and rear wheels, the footplate having a top and a bottom; and front and rear steering means respectively interconnecting the front and rear wheels to the footplate,
   the steering means respectively interconnecting the front axle and the rear axle to the footplate;
   each steering means comprising the pair of spaced arms having first and second ends, the respective first arm ends being pivotally interconnected to the footplate by pivot pins;
   pairs of vertical rods respectively connected to the second ends of the front wheel arms and to the second ends of the rear wheel arms;
   a cursor respectively positioned on each of the vertical rods, the front wheel axle being secured between a first pair of cursors and the rear wheel axle being secured between a second pair of cursors;
   the said respective pairs of arms, an axle and the portion of the footplate defined between pivot pins defining front and rear trapeziums, each trapezium having a large base and a small base, the said axles being the respective small base of each trapezium.

2. The coaster of claim 1 wherein first extensions from the first arm ends of the front steering means and second extensions from the first arm ends of the rear steering means.

3. The coaster of claim 2 and first and second rods interconnecting respectively a first arm extension with a second arm extension.

4. The coaster of claim 3 wherein the interconnections between the first and second rods and the first and second arm extensions are pivotal.

5. The coaster of claim 4 wherein the first extensions comprise first right and left extensions and the second extensions comprise second right and left extensions and wherein the first rod interconnects the first right extension and the second left extension and the second rod interconnects the first left extension with the second right extension.

6. The coaster of claim 1 and an adjustable skid secured to the bottom of the footplate, the skid comprising a curved body defined between front and rear connections, the front and rear connections being secured to the footplate, at least one of the front and rear connections being movable relative to the other along the footplate to vary the curvature of the skid body.

7. The coaster of claim 6 and a non-slip net covering the top of the footplate.

* * * * *